Patented Nov. 14, 1950

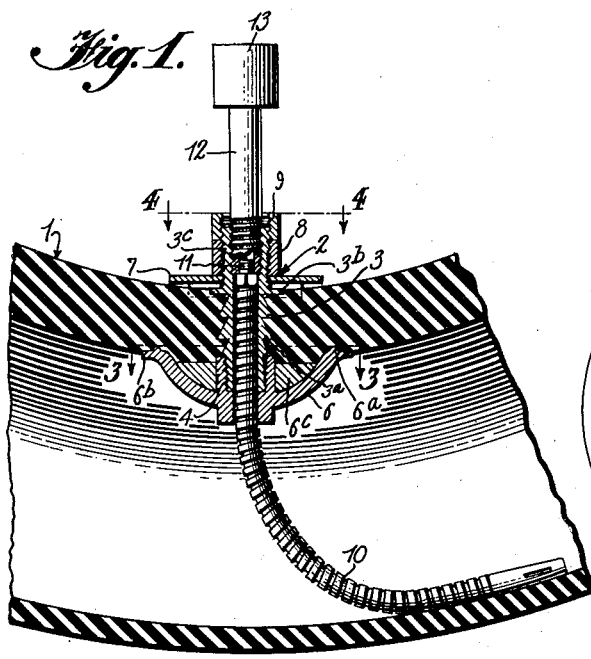

2,530,055

UNITED STATES PATENT OFFICE 2,530,055

AIR BAG STEM

Freddie C. Green, Altoona, Ala.

Application February 3, 1949, Serial No. 74,377

8 Claims. (Cl. 18—45)

1

This invention relates to an improvement in air bags for use in shaping and forming pneumatic tire casing during vulcanization thereof. The invention is particularly directed to an improved stem and manner of connecting it to the air bag, the stem providing the means through which air, inert gases, water or steam may be introduced into the bag.

In the manufacture of pneumatic tires the cost of inflatable formers, commonly referred to as air bags or curing bags, represents a substantial portion of the cost of manufacture of the tire. In inserting the bag within the tire band and during the subsequent removal of the bag from the shaped tire, the stem is often used by the workman as a handle, thereby imposing excessive strains which tear the rubber away from the stem and as a result leakage of the inflating fluid past the stem soon occurs. It often happens that this leakage develops well before the bag itself becomes unserviceable and therefore if the stem cannot be securely fastened in the bag it is necessary to salvage it. Leaks in the air bag during the curing operation may cause a defective tire. Therefore it is extremely desirable to provide an inflation stem which can be properly anchored to the thick walls of the air bag in such a manner that it can withstand the strains during operations and in which the connection between the stem and the air bag will have a life which is substantially equal to that of the material of the bag itself. This has presented a major problem in industry for many years.

One of the primary objects of the present invention is to provide a stem construction whereby the usual rubber to metal seal is supplemented by a mechanical bond which can be tightened after the air bag has been vulcanized. It is usual to use a metal stem made of brass and to provide a rubber to metal bond when the air bag is vulcanized but if this bond alone is relied upon the seal would probably be broken before the material of the bag becomes otherwise unserviceable. Accordingly, the present invention provides an arrangement whereby the rubber around the stem is clamped between two members on the stem to reduce the stress applied to the rubber to metal bond when the stem is used to pull the air bag from the tire.

Another object is to provide a stem for use in an air bag in which the maximum area of bond between the rubber and metal will be provided consistent with the size and flexibility which must be provided.

Another object is to provide an improved stem for curing bags in which clamping members may be tightened on the rubber after the rubber to metal bond has been provided.

Another object is to provide an air bag stem so constructed that the clamping means may be adjusted to stop the leaks as soon as a slight break occurs between the rubber to metal bond.

A still further object is to provide an improved stem having anchoring means which will securely hold the stem in fixed relation to the tube in which it is embedded and prevent the flow of the rubber away from the stem when pressure is applied to the rubber by the clamping means.

A still further object is to provide a stem for curing bags in which the stem may be removed from the worn out curing bags that can be used in a new bag without expensive salvaging operations.

Another object is to provide an improved stem having appropriate anchoring means which serve, in effect, as a rolling type joint which reduces the strain on the rubber at the point of its attachment to the stem upon the application of excessive tilting movements of the stem.

Other and further objects will become readily apparent from the following description when considered in connection with the accompanying drawings, illustrating an embodiment of the invention, and in which:

Figure 1 is a vertical sectional view through a stem and a portion of a curing bag in accordance with the present invention;

Figure 2 is an elevational view similar to Figure 1 showing the manner in which the attachment means serves as a fulcrum point to reduce the stresses in the rubber at the point of its attachment to the stem;

Figure 3 is a top plan view along line 3—3 of Figure 1 showing one of the parts of the means for attaching the stem to the air bag;

Figure 4 is a plan view on line 4—4 of Figure 1; and

Figure 5 is a modified form in section of the attaching means shown in Figure 3.

Referring specifically to the drawings, reference numeral 1 denotes in fragmentary form, the air bag, sometimes commonly referred to as curing bag, which is usually made of rubber, the inner periphery of which is usually very thick. The valve stem assembly 2 comprises a central core member 3 which is provided with suitable corrugations 3a for the purpose of increasing the area of contact between the rubber and the stem and, as will appear later, contributes to the lengthening of the path which any steam or gas must travel in coming from the inside of the bag following along the surface of the stem and its attachment means to the outside of the bag.

The lower end of the core member 3 is provided with suitable screw threads 4 which are screw-threadedly engaged by internal threads on a lower cup-shaped member 6. The cup-shaped member 6 is provided with an annular V-shaped boss 6a which engages and is embedded in the rubber of the air bag when the stem is in assembled relation. Surrounding the annular boss 6a is a flange 6b which reduces the tendency for the boss 6a to cut the rubber. As is clearly seen in Figure 3, a plurality of radial ribs 6c are provided, the primary purpose of which is to anchor the cup 6 against turning movement relative to the air bag when the core 3 is threaded into the central boss of the cup and also when the clamping means are subsequently tightened.

The upper end of the core 3 is provided with a radially extending annular flange 3b which is embedded in the rubber of the air bag 1. This flange serves to initially compress the rubber of the air bag wall when the core 3 is screwed into the central boss of the cup 6. A screw threaded portion 3c of the core 3 extends upwardly beyond the flange 3b and is engaged by complementally threaded nut 8. The nut 8 may be screwed down to force the washer 7 against the outer wall of the air bag. A second nut 9 is provided primarily for the purpose of protecting the end threads of the upper end of the core 3. The elongated washer 7 and the nut 8 constitute an important feature of the invention because, as will be apparent from a later description, the nut provides an adjusting feature for increasing the clamping action on the rubber which is trapped between the washer 7 and the annular boss 6a of the cup 6.

It will be noted that the washer 7 is of generally oval configuration and is provided with depending flanges 7a and 7b. The washer 7 is assembled so that its maximum dimension is parallel to the plane of the air bag so that when the nut 8 is screwed down the intervening wall of the tube will be forced toward the interior of the cup member 6, the depending flanges 7a and 7b having a tendency to warp the wall of the tube into a portion of a torus which is the general natural shape of the air bag. This greatly strengthens the mechanical bond between the stem and the wall of the air bag.

Another important feature of the present invention is the provision for assembling a flexible drain tube 10 in the stem assembly 2 so that it can be readily replaced. Heretofore it has been common practice to attach the end of the drain tube to a part of the stem which would roughly correspond to the bottom of the cup member 6. It often happens that these flexible drain tubes break off. In the prior devices it is impossible to repair the drain tube without cutting out the valve stem and replacing it. In the present invention the upper end of the drain tube is provided with a suitable threaded nipple 11 which is screwthreaded in an external pipe 12 which is connected to the usual female end 13 of a conventional coupling through which the inflating and vulcanizing fluid is injected into the air bag and through which the condensate in the air bag may be drained. The lower end of pipe 12 is externally threaded and engages internal threads in the upper end of the core member 3. It will be readily apparent that should the flexible drain tube 10 break, the pipe 12 may be unscrewed from the core 3, thereby pulling out the part of the drain tube still remaining attached thereto. Of course the broken off end of the drain tube will be inside the air bag but this will be of no consequence. It will be apparent that a new drain tube can be screwed into the lower end of the pipe 12 which can then again be screwed into the core 3 without disturbing the stem assembly 2.

In attaching the stem assembly 2 in the air bag, the cup 6 will be filled with uncured suitably compounded vulcanizable rubber and the underside of the inner wall of the air bag will be prepared in the conventional manner so that the uncured rubber in the cup will vulcanize into an integral mass with the air bag wall. It is to be understood in this connection that the stem of this invention would be assembled through a hole in an extruded tubular section before the two ends of the section are vulcanized together to form the annular bag. Before the core 3 is inserted in the hole in the air bag wall a gum strip of uncured suitably compounded vulcanizable rubber would be wrapped around corrugations 3a and the outside would be dipped in suitable solvent which would also serve as a lubricant when the core 3 is inserted in the hole of the air bag wall. The operator would then hold the cup 6 with one hand against the lower side wall and screw the core 3 into the central boss of the cup. This, of course, would cause the flange 3b to embed itself in the outer wall of the air bag and produce initial depression in the intervening rubber. Thereafter the washer 7 would be placed over the outer end of the threaded end 3c of the core member and would be screwed down reasonably tight until the depending flanges 7a and 7b embed themselves in the wall of the air bag and tend to press the wall of the tube into the cup 6. The air bag is then ready to be cured in the conventional manner. It will be readily apparent that during the curing operation the mass of rubber in the lower cup 6 and the gum strip which is wound around the core 3 would become integral with the wall of the air bag. Thereafter the drain tube may be inserted in the manner explained hereinbefore. It will be apparent that the nut 8 can subsequently be screwed down to the desired amount to increase the mechanical connection between the wall of the air bag and the stem. In the event a slight leak should develop where the steam would creep along the surface of the cup and the core and the washer 7, the nut 8 can be tightened down to prevent the break in the seal between the wall of the air bag and the stem. The nut 9 would be screwed down to follow the nut 8 for the purpose of protecting the end threads.

In Figure 5 a modified cup member 20 is shown in which, instead of the ribs 6c of the previous form, a plurality of concentric cones 21 and 22 are provided. The edges of the cones are serrated as shown for the purpose of increasing the frictional engagement with the wall of the air bag when the nut 8 is screwed down. The advantage of this modification is that the path which the steam must travel in creeping along the surface of the stem assembly will be increased because the steam or other fluid must creep along the inside surface of the cup 20 and then back up the outer surface of the cone 22 down the inside thereof then back on the outside of the next cone 22 and then back inwardly along the inside of cone 21 and then up the central boss along the corrugated surface of the core 3 and along the surface of the flange 3b and around the surface of the washer 7.

From the foregoing description it will be apparent that the present invention provides an improved stem for air or curing bags in which the path which the steam or other heated fluid must pass is a maximum consistent with the limitations of size which must be placed upon the valve assembly. Also, it will be apparent that the cup-shaped member is of a diameter greater than the maximum dimension of either the flange 3b or that of the washer 7 and therefore constitutes what might be described as a fulcrum point for any rocking movement of the stem. In effect, this provides a joint similar to a ball and socket connection and thereby greatly reduces the stress on the rubber where it is in contact with the stem core. Also the combination of the elongated washer with the annular cup member tends to hold the rubber of the air bag wall in the natural shape that it will take in the cured condition. Also the novel connection for the flexible drain tube provides a means of ready replacement which replacement is very closely associated with the replacement problem involved in previous air bag stems. With the present invention the need for replacing the stem because of the breakage of the drainage tube is completely eliminated and at the same time a connection is provided between the tube and the stem which greatly increases the useful life of the assembly.

The relative disposition of the concave side of cup member 6 with respect to the corrugations 3a which are in the form of downwardly flared frusto conical skirts greatly contributes to the mechanical sealing action of the stem. It is to be noted that the space between the depending flanges 7a and 7b of the washer is substantially less than the diameter of the rim of the cup member 6 so that when the nut 8 is screwed down to clamp the intervening rubber between the washer and the cup member, the edges of the cup member 6 will serve as a fulcrum so that as the washer is forced toward the cup, the rubber will tend to rotate around the periphery of the cup and be forced into tighter engagement with the corrugated portion of the stem. It is well known that rubber under pressure gradually flows away from the pressure and therefore the clamping connection of the previous stems had certain disadvantages which are overcome by the present construction in which there is a tendency to cause the pliable rubber of the air bag wall to roll around the edge of the cup toward the stem which tends to overcome the normal tendency of the rubber to flow away from between the clamping members.

Although the invention has been described in considerable detail, it will be apparent to those skilled in the art that many variations are possible without departing from the inventive concept. It is therefore desired that the invention not be limited except insofar as is made necessary by the prior art and by the appended claims.

What is claimed is:

1. In combination with an inflatable article having a body of pliable material, and inflating stem extending through the side wall of said body, said stem comprising a hollow bolt provided with an intermediate corrugated portion and terminating in externally threaded ends, a pair of anchor members, one of said anchor members being of annular cup-shaped form threaded to one end of said bolt and disposed with its concave side toward said corrugations on said bolt, the other of said anchor members being in the form of an elongated plate coupled to the other end of said bolt and positioned by means of a nut threaded to said other end, said plate having transverse flanges at the opposite sides thereof facing toward said corrugations of said bolt and the lateral spacing of said flanges being substantially less than the diameter of said cup-shaped member.

2. In combination with an air bag having a body of pliable material, an inflating stem extending through the side wall of said body, said stem comprising a hollow core provided with an intermediate portion having a series of frusto conical skirts, an annular concave bowl forming an anchor member carried by said core on the inner side of said wall, and a clamping member carried by said stem on the opposite side of said side wall comprising an elongated plate having a transverse diametrically opposed pair of flanges depending inwardly therefrom toward said skirts, said concave bowl facing in the direction of said clamping member, the maximum dimension of said clamping member being less than that of said annular bowl member whereby when said clamping member is forced against the side wall of said body the pliable material thereof will be caused to fulcrum around the edges of said annular bowl member into lightly compressed relation against and into the corrugations of said frusto conical skirts.

3. In combination with an air bag having a body of pliable material, an inflating and drain tube assembly comprising a hollow core secured to and extending through the side wall of said body, a flexible drain tube projecting from internally of the air bag into and substantially through said core and being of smaller diameter than the core, said tube having an externally threaded nipple threaded to a coupling member sealed to the outer end of said core, whereby said drain tube can be removed from the outside of said body without removing the core from the wall thereof.

4. In combination with an inflatable air bag having a body of pliable material, an inflating and draining stem comprising a central core secured to and extending through the side wall of said body having an intermediate corrugated portion, an anchor on said core engaging the inner side of said side wall, a clamp carried by said stem on the opposite side of said side wall for forcing the intermediate pliable material of said side wall against said core, a flexible drain tube having an externally threaded nipple, a coupling member sealed to the outer end of said core and said nipple of said drain tube being threadedly engaged with said coupling member.

5. In combination with an inflatable article having a body of pliable material, an inflating stem extending through the side wall of said body, said stem comprising a hollow bolt provided with an intermediate corrugated portion and terminating in externally threaded ends, a pair of anchor members, one of said anchor members threaded to one end of said bolt comprising an annular disc of concave cross section disposed with its concave side toward said corrugations on said bolt, the other of said anchor members being in the form of an elongated plate positioned adjacent the other end of said bolt in surrounding relation therewith by means of a nut threaded to said other end, said plate having transverse flanges at the opposite sides thereof facing toward said corrugations of said bolt and the latteral spacing of said flanges being substantially less than the diameter of said cup-shaped member, said transverse flanges and said annular concave disc coacting to force the adjacent pliable material in tightly compressed relation against said corrugated portions tending to warp the adjacent side wall of said body into the shape of a torus.

6. In combination with an air bag having a body of pliable material, an inflating and draining stem extending through the side wall of said body, said stem comprising a hollow central core provided with an intermediate corrugated portion formed of frusto-conical skirts and terminating in externally threaded ends, a pair of anchor members, one of said anchor members threaded to one end of said bolt comprising an annular concave bowl disposed with a concave surface toward said corrugations, the other of said anchor members comprising an elongated plate disposed adjacent the other end of said bolt in surrounding relation therewith and positioned by means of an abutting nut threaded to said other end, said plate having a diametrically opposed pair of transverse flanges depending inwardly therefrom toward said skirts, the maximum dimension of said plate member being less than that of said anchor member and said plate and anchor members coacting to force the adjacent pliable material thereof to fulcrum around the edges of said concave anchor member into tightly compressed relation against the corrugations of said frusto-conical skirts, a flexible drain tube having an externally threaded nipple, a coupling member sealed to the outer end of said core, and said nipple of said drain tube being threadedly engaged with said coupling member whereby said drain tube can be removed from the outside of said body without removal of the core from the wall thereof.

7. In combination with an air bag having a body of pliable material, an inflating and drain tube assembly comprising a hollow core secured to and extending through the side wall of said body, a flexible drain tube projecting from internally of said air bag into and substantially through said core, and coupling means intercoupled between the end of said tube projecting into said core and the outer end of said core securing said tube against withdrawal inwardly of said core into said bag and permitting withdrawal of the tube from externally of said bag without removing the core from the wall thereof.

8. In combination with an inflatable air bag having a body of pliable material, an inflating and draining stem comprising a central core member secured to and extending through the side wall of said body and having an intermediate corrugated portion, a bore extending entirely through said core member concentric with the axis thereof, an anchor on said core member engaging the inner side of said side wall, a clamp carried by said stem on the opposite side of said side wall for forcing the intermediate pliable material of said side wall against said core member, a flexible drain tube disposed in said bore and extending substantially entirely through said core member, said flexible drain tube terminating in an outer end adjacent the exterior end of said core member and the inner end of said tube projecting into said air bag, and anchoring means removably coupling the outer end of said tube to said core member adjacent the exterior end thereof to secure said tube against withdrawal inwardly of said core into said bag and permit withdrawal of said tube from externally of said air bag.

FREDDIE C. GREEN.

REFERENCES CITED

The following references are of record in the file of this patent:

UNITED STATES PATENTS

| Number | Name | Date |
|---|---|---|
| 1,657,820 | Corlett | Jan. 31, 1928 |
| 1,755,048 | Brice | Apr. 15, 1930 |
| 1,818,536 | Crossan et al. | Aug. 11, 1931 |
| 1,927,803 | Mullin | Sept. 19, 1933 |
| 2,218,639 | Crowley | Oct. 22, 1940 |
| 2,318,376 | Crowley | May 4, 1943 |
| 2,435,466 | Thomas | Feb. 3, 1948 |